United States Patent
Shin et al.

(10) Patent No.: US 9,464,681 B2
(45) Date of Patent: Oct. 11, 2016

(54) PARKING BRAKE APPARATUS

(71) Applicant: HYUNDAI MOBIS CO., LTD., Seoul (KR)

(72) Inventors: Choong Sik Shin, Suwon-si (KR); Jae Hyun Park, Yongin-si (KR); Ha Min Jung, Hwaseong-si (KR); Chun Su Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/583,506

(22) Filed: Dec. 26, 2014

(65) Prior Publication Data

US 2015/0345581 A1 Dec. 3, 2015

(30) Foreign Application Priority Data

May 28, 2014 (KR) ........................ 10-2014-0064555

(51) Int. Cl.
| | |
|---|---|
| *F16D 65/72* | (2006.01) |
| *F16D 65/16* | (2006.01) |
| *F16D 121/04* | (2012.01) |
| *F16D 121/24* | (2012.01) |
| *F16D 125/06* | (2012.01) |
| *F16D 125/40* | (2012.01) |
| *F16D 123/00* | (2012.01) |
| *F16D 125/42* | (2012.01) |
| *F16D 125/60* | (2012.01) |

(52) U.S. Cl.
CPC ........... *F16D 65/16* (2013.01); *F16D 2121/04* (2013.01); *F16D 2121/24* (2013.01); *F16D 2123/00* (2013.01); *F16D 2125/06* (2013.01); *F16D 2125/40* (2013.01); *F16D 2125/42* (2013.01); *F16D 2125/60* (2013.01)

(58) Field of Classification Search
CPC .... F16D 65/72; F16D 65/16; F16D 2125/40; F16D 2121/24; F16D 2125/06; F16D 2121/04; F16D 2125/60; F16D 2125/62
USPC ............ 188/106 F, 2 D, 72.8, 71.9, 156, 162
See application file for complete search history.

(56) References Cited

U.S. PATENT DOCUMENTS

| | | | |
|---|---|---|---|
| 5,180,038 A * | 1/1993 | Arnold ................. | B60T 13/743 188/171 |
| 5,590,744 A * | 1/1997 | Belmond ................ | B60T 7/107 188/2 D |

(Continued)

FOREIGN PATENT DOCUMENTS

KR 10-2009-0110574 A 10/2009

*Primary Examiner* — Thomas J Williams
*Assistant Examiner* — Mariano Sy
(74) *Attorney, Agent, or Firm* — Knobbe Martens Olson & Bear LLP

(57) ABSTRACT

A parking brake apparatus may include: a housing; a gear unit installed in the housing, and rotated by operation of a motor unit; a nut screw part connected to the gear unit, and rotated by the rotation of the gear unit; a bolt screw coupled the nut screw part so as to pass through the nut screw part, and moved in a longitudinal direction inside the nut screw part in connection with the rotation of the nut screw part; a cable connected to the bolt screw; a piston unit installed to be slidably moved in the housing, and having one side through which the cable passes and the other side which is extended toward the nut screw part; and an elastic member arranged between an inner wall of the housing and the piston unit, and elastically deformed as the piston is slidably moved.

7 Claims, 9 Drawing Sheets

(56) References Cited

U.S. PATENT DOCUMENTS

| | | | |
|---|---|---|---|
| 6,386,338 B1 * | 5/2002 | Powrozek | B60T 7/107 188/106 P |
| 7,341,127 B2 * | 3/2008 | Gil | B60T 7/107 188/156 |
| 7,490,699 B2 * | 2/2009 | Gil | B60T 7/107 188/1.11 R |
| 7,779,968 B2 * | 8/2010 | Noh | B60T 7/107 188/156 |
| 8,051,956 B2 * | 11/2011 | Huang | B60T 11/046 188/158 |
| 8,210,326 B2 * | 7/2012 | Kim | B60T 11/046 188/156 |
| 8,365,874 B2 * | 2/2013 | Huang | B60T 7/107 188/156 |
| 8,607,938 B2 * | 12/2013 | Lee | B60T 11/046 188/162 |
| 2015/0152929 A1 * | 6/2015 | Roos | B60T 7/107 188/162 |
| 2015/0330465 A1 * | 11/2015 | Shin | F16D 65/16 188/162 |

* cited by examiner

PARKING BRAKE APPARATUS

CROSS-REFERENCES TO RELATED APPLICATIONS

The present application claims priority to Korean application number 10-2014-0064555, filed on May 28, 2014, which is incorporated by reference in its entirety.

BACKGROUND

The present disclosure relates to a parking brake apparatus, and more particularly, to a parking brake apparatus capable of preventing a reduction in braking force by compensating for a gap between components when a brake operation is released.

In general, a parking brake apparatus is used to prevent the movement of a parked vehicle. An electronic parking brake (EPB) converts a rotational motion of a motor unit into a linear motion and transmits a braking force to a wheel.

The related art of the present invention is disclosed in Korean Patent Laid-open Publication No. 2009-0039056 published on Apr. 22, 2009 and entitled "Electronic parking brake system in vehicle".

SUMMARY

Embodiments of the present invention are directed to a parking brake apparatus capable of preventing a reduction of braking force by compensating for a gap between components when a brake operation is released.

In one embodiment, a parking brake apparatus may include: a housing; a gear unit installed in the housing, and rotated by operation of a motor unit; a nut screw part connected to the gear unit, and rotated by the rotation of the gear unit; a bolt screw coupled the nut screw part so as to pass through the nut screw part, and moved in a longitudinal direction inside the nut screw part in connection with the rotation of the nut screw part; a cable connected to the bolt screw; a piston unit installed to be slidably moved in the housing, and having one side through which the cable passes and the other side which is extended toward the nut screw part; and an elastic member arranged between an inner wall of the housing and the piston unit, and elastically deformed as the piston is slidably moved.

The housing may have a nut screw space part in which the nut screw part is moved in the opposite direction of the movement direction of the bolt screw.

The nut screw space part may have a stepped portion formed on a movement path of the nut screw part so as to restrict the movement of the nut screw part.

When the nut screw part is moved in the opposite direction of the movement direction of the bolt screw, the piston unit may be pressurized and moved by the nut screw part so as to compress the elastic member.

When the operation of the motor unit is stopped, the elastic member may pressurize and move the piston unit while being restored to the original state, and the cable may be pulled while the nut screw part and the bolt screw are moved in connection with the movement of the piston unit.

The cable may be pulled to compensate for a gap between an operating lever and a ring connection part connected to the cable.

The parking brake apparatus may further include a cable connection part arranged between the bolt screw and the cable and connecting the bolt screw and the cable.

The gear unit may include: a driving gear connected to a rotating shaft of the motor unit and having a plurality of gears formed on the outer circumferential surface thereof; and a driven gear having one end engaged with the driving gear and the other end connected to the nut screw part. The driven gear may be moved in connection with the movement of the nut screw part.

In another embodiment, a parking brake apparatus may include: a housing; a gear unit installed in the housing, and rotated by operation of a motor unit; a nut screw part connected to the gear unit, and rotated by the rotation of the gear unit; a bolt screw coupled to the nut screw part so as to pass through the nut screw part, and moved in a longitudinal direction inside the nut screw part in connection with the rotation of the nut screw part; a compression case connected to the bolt screw; a cable connected to the compression case; and an elastic member installed in the compression case, and elastically deformed according to the movement of the compression case.

The compression case may include: a compression case body having one end to which the bolt screw is connected and the other end through which the cable passes; a fixing member arranged in the compression case body, and connected to the cable while supporting one end of the elastic member wound the fixing member; and a pressurizing member extended from the other end of the compression case body, and supporting the other end of the elastic member.

When the compression case is moved according to the movement of the bolt screw, the elastic member may be compressed as an interval between the pressurizing member and the fixing member decreases.

When the operation of the motor unit is stopped, the elastic member may pressurize and move the fixing member while being restored to the original state, and move the cable toward the fixing member.

The cable may be moved toward the fixing member so as to compensate for a gap between an operating lever and a ring connection part connected to the cable.

The gear unit may include: a driving gear connected to a rotating shaft of the motor unit, and having a plurality of gears formed on the outer circumferential surface thereof; and a driven gear having an end engaged with the driving gear and the other end connected to the nut screw part.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

In an EPB, when a driver manipulates a button, switch, or lever to drive the motor unit, a gear unit and a nut screw are rotated according to the rotation of the motor unit, a bolt screw is moved through the nut screw along the longitudinal direction, and a cable connected to the bolt screw is pulled to generate a braking force.

In general, the EPB driven by the motor unit cannot compensate for a gap which is formed between the operating lever and a ring connection part for connecting the operating lever and the cable, due to contraction caused by a temperature change and a phase change of the operating lever, after the brake of the vehicle is operated.

Thus, when an additional operating force is set to be provided to the cable in order to compensate for the gap between the operating lever and the ring connection part, the parking brake apparatus may be damaged or the price of the product may be increased. Furthermore, when a friction material contracts due to a temperature decrease after the vehicle is parked, the braking force may be lost.

Figure 1:
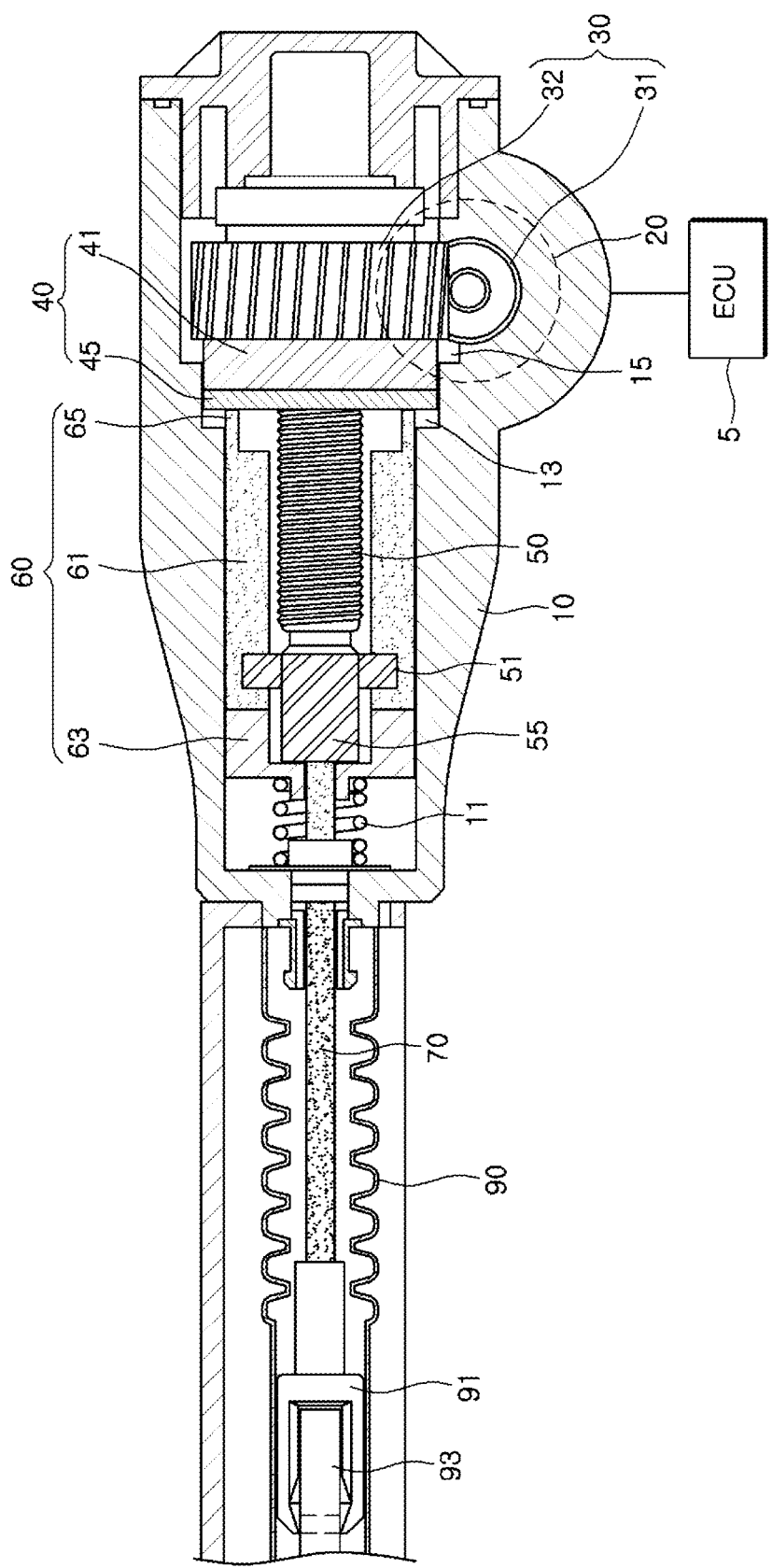
FIG. 1 is a schematic side cross-sectional view of a parking brake apparatus in accordance with an embodiment of the present invention.
Figure 2:
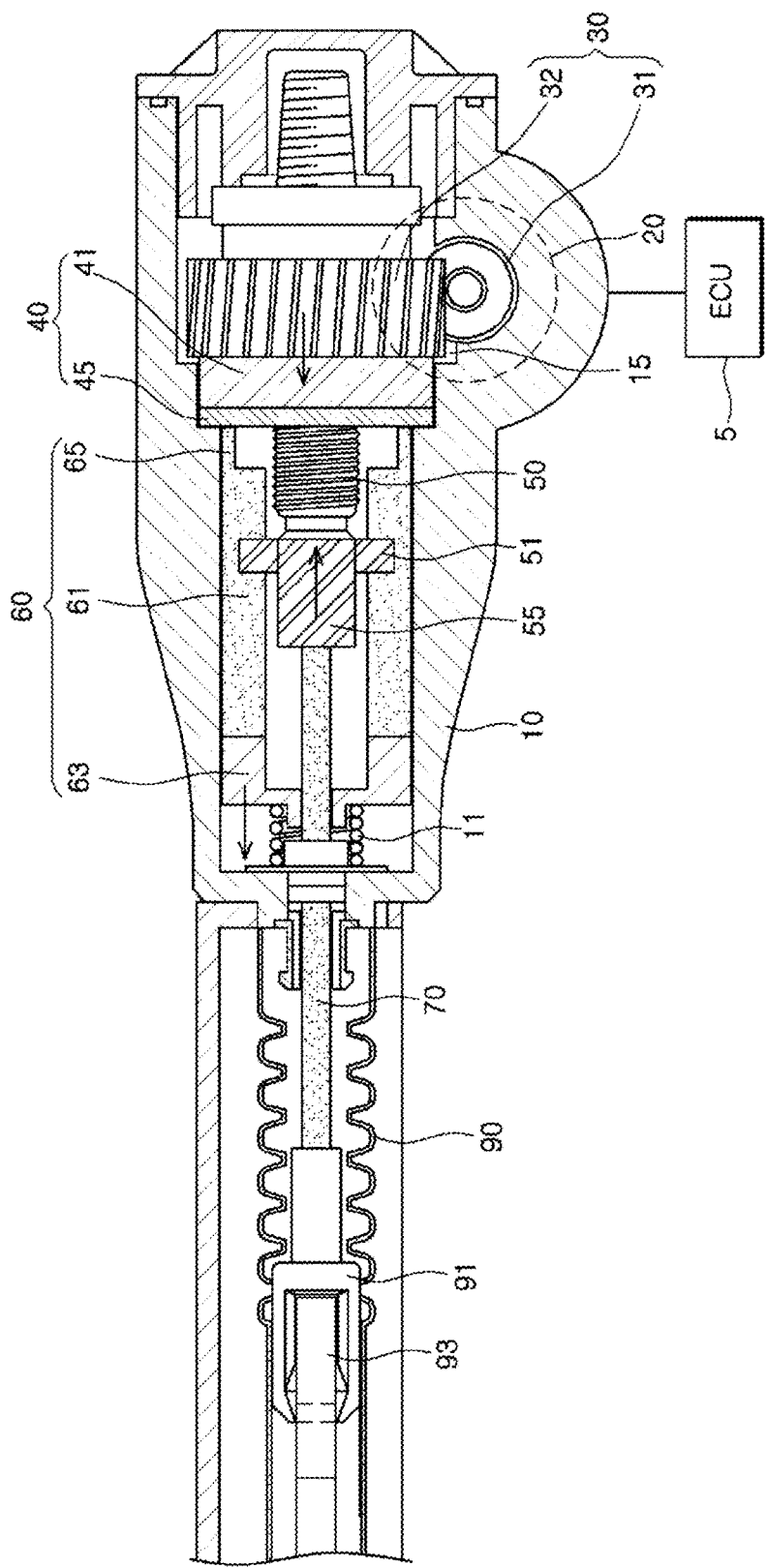
FIG. 2 is a schematic operation diagram illustrating that an elastic member is compressed in the parking brake apparatus in accordance with the embodiment of the present invention.
Figure 3:
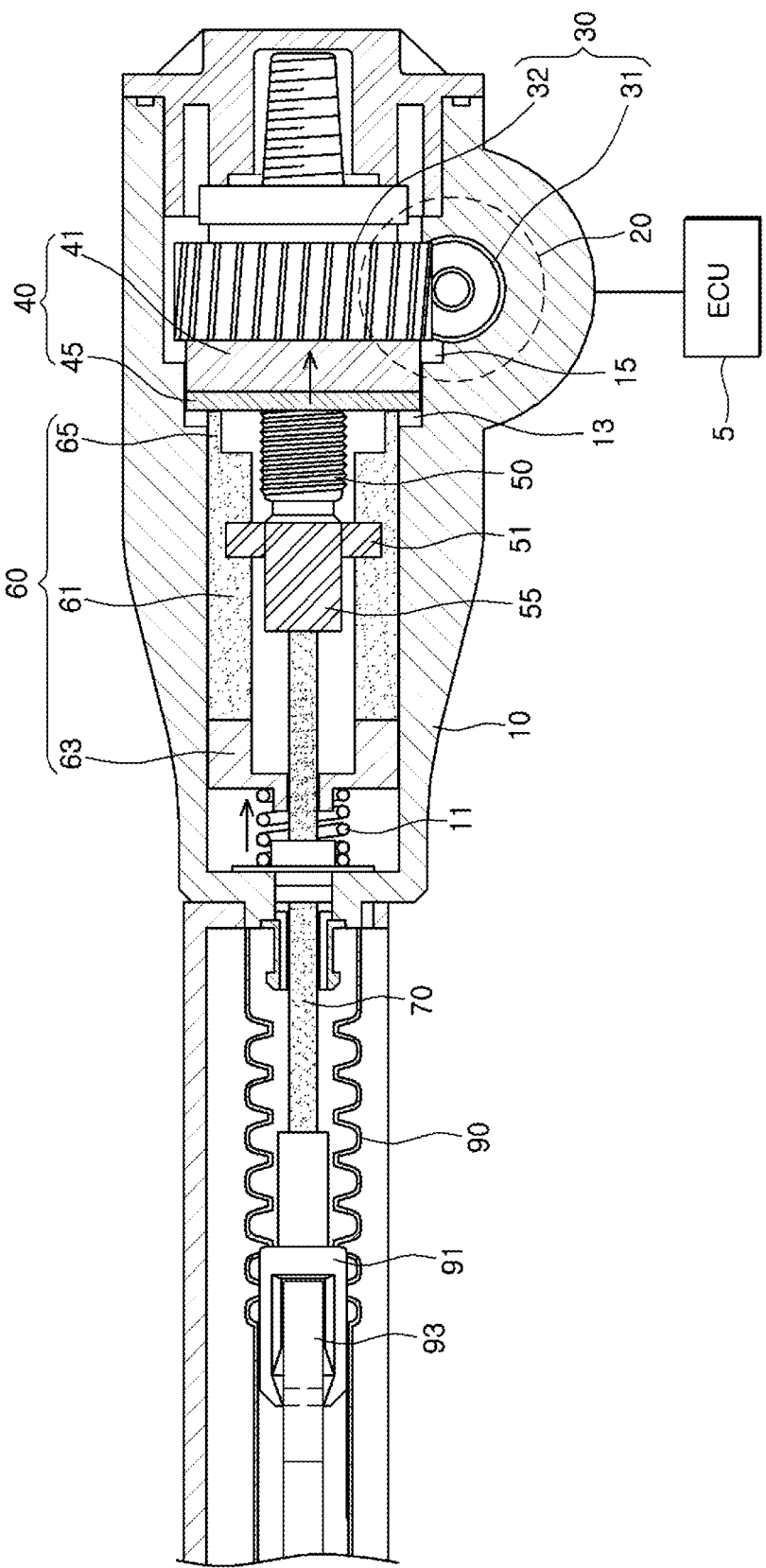
FIG. 3 is a schematic operation diagram illustrating a state in which the elastic member is restored in the parking brake apparatus in accordance with the embodiment of the present invention.

FIG. 1 is a schematic side cross-sectional view of a parking brake apparatus in accordance with an embodiment of the present invention. FIG. 2 is a schematic operation diagram illustrating the parking brake apparatus in accordance with the embodiment of the present invention. FIG. 3 is a schematic operation diagram illustrating a state in which an elastic member is restored in the parking brake apparatus in accordance with the embodiment of the present invention.

Referring to FIG. 1, the parking brake apparatus in accordance with the embodiment of the present invention may include an electronic control unit (ECU) 5, a housing 10, a motor unit 20, a gear unit 30, a nut screw part 40, a bolt screw 50, a piston unit 60, a cable 70, and a boot part 90.

The housing 10 may have a space formed therein, and include a metallic material or synthetic resin. The housing 10 may prevent internal parts, such as the gear unit 30, the nut screw part 40, the bolt screw 50, and the piston unit 60, from being damaged by an external impact, or prevent the internal parts from being contaminated by foreign matters introduced from outside.

The housing 10 may include an elastic member 11 installed at one side thereof (left side in FIG. 1), and the elastic member 11 may be formed of rubber or silicone. The elastic member 11 may prevent the piston unit 60 from colliding with the inner wall of the housing 10 while the piston unit 60 is slidably moved in the housing 10, thereby preventing the damage of the piston unit 60 and the housing 10. The piston unit 60 may be slid inside the housing 10. In the present embodiment, the elastic member 11 may include a spring, for example.

The housing 10 may include a nut screw space part 13 and a gear space part 15 which are formed at the other side thereof (right side in FIG. 1). The nut screw space part 13 may provide a space in which the nut screw part 40 can be moved to the left, and the gear space part 15 may provide a space in which a driven gear 32 of the gear unit 30 can be moved to the left.

The nut screw part 40 and the driven gear 32 may be connected to each other and moved together. Thus, when the nut screw part 40 is moved in the nut screw space part 13, the driven gear 32 may be moved in the gear space part 15 according to the movement of the nut screw part 40. The nut screw space part 13 may have a narrower movement space than the gear space part 15. In FIG. 1, the side-to-side length of the nut screw space part 13 may be set to be smaller than the side-to-side length of the gear space part 15.

Thus, before the driven gear 32 reaches a stepped portion of the gear space part 15, the nut screw part 40 may reach a stepped portion of the nut screw space part 13. Then, when the movement of the nut screw part 40 is restricted from moving to the left in the nut screw space part 13, the driven gear 32 may be restricted from moving to the left even before reaching the stepped portion of the gear space part 15. In the nut screw space part 13, a buffer part may be arranged on the surface contacted with the nut screw part 40, in order to buffer an impact when coming in contact with the nut screw part 40.

The motor unit 20 may be installed inside or outside the housing 10. The operation of the motor unit 20 may be controlled by the ECU 5. The motor unit 20 may convert electric energy applied from outside into rotational energy.

The rotational energy generated by the motor unit 20 may be transmitted to the gear unit 30 so as to rotate the gear unit 30 in a state where the rotation speed thereof is controlled. The ECU 5 may determine whether to operate the motor unit 20, based on a load increase of the motor unit 20 (that is, a current increase). For example, the ECU 5 may stop the operation of the motor unit 20 when the load of the motor unit 20 rapidly increases.

The bolt screw 50 may have a cable connection part 55 formed at an end thereof (left end in FIG. 1), and the cable connection part 55 may have a pin 51 protruding in the outer direction. The cable connection part 55 may be connected to the cable 70. When the bolt screw 50 is moved to the right, the cable 70 may be moved to the right through the cable connection part 55.

The cable 70 may include a ring connection part 91 connected to one side thereof (left side in FIG. 1). The ring connection part 91 may be connected to an operating lever 93 to operate a brake. When the cable 70 is pulled to the right, the operating lever 93 may be operated to transmit a braking force to a wheel of the vehicle. At this time, when the brake operation of the parking brake apparatus is released, a gap may occur between the ring connection part 91 and the operating lever 93 while the position of the operating lever 93 or the like is changed. At this time, when a brake operation is performed again through the parking brake apparatus, the operating force of the cable 70 to pull the operating lever 93 may be reduced due to the gap between the ring connection part 91 and the operating lever 93. In the present embodiment, when a gap occurs between the ring connection part 91 and the operating lever 93, the parking brake apparatus may immediately compensate for the gap using the elastic member 11, thereby preventing the reduction in operating force of the cable 70.

The boot part 90 may have an internal space through which the cable 70 passes, and include a plurality of creases formed on the outer surface thereof, in order to block foreign matters or moisture from being introduced from outside. The boot part 90 may be formed of a rubber material which can be elastically changed.

The gear unit 30 may be operated by power transmitted from the motor unit 20, and include a driving gear 31 and the driven gear 32. The driving gear 31 may be connected to a rotating shaft of the motor unit 20, and have a plurality of gears formed on the outer circumferential surface thereof. One end of the driven gear 32 may be engaged with the driving gear 31, and the other end (left side in FIG. 1) of the driven gear 32 may be connected to the nut screw part 40. The driven gear 32 and the nut screw part 40 may be fixed to each other. When the driven gear 32 is rotated, the nut screw part 40 may be rotated together. The driven gear 32 may have a screw thread formed on the inner circumferential surface thereof so as to be screwed to the bolt screw 50.

Since the gear unit 30 includes the driving gear 31 and the driven gear 32, the gear unit 30 may convert a rotational motion of the motor unit 20 into a linear motion, and reduce the installation space of the gear unit 30. As the driving gear 31 is connected to the shaft of the motor unit 20, the position of the driving gear 31 may be fixed. As the driven gear 32 is connected to the nut screw part 40, the driven gear 32 may be moved according to the movement of the nut screw part 40 within the gear space part 15. In the present embodiment, the driving gear 31 may be implemented with a worm gear, and the driven gear 32 may be implemented with a helical gear.

The nut screw part 40 may be connected to the driven gear 32 of the gear unit 30, and rotated by the operation of the gear unit 30. The nut screw part 40 may be coupled to the bolt screw 50 so as to pass through the bolt screw 50. In the present embodiment, the nut screw part 40 may include a nut screw 41 and a bearing 45. The nut screw 41 may be connected to the driven gear 32, and rotated when the driven gear 32 is rotated. The bearing 45 may be installed at one side of the nut screw 41, that is, at the opposite side of the other side at which the driven gear 32 is arranged, and help the nut screw 41 to smoothly rotate.

Referring to FIGS. 1 and 2, when the parking brake is operated, the bolt screw 50 may be moved to the right, and the nut screw part 40 and the driven gear 32 may be moved to the left corresponding to the opposite direction of the bolt screw 50. At this time, as the nut screw part 40 is moved to the left, the nut screw part 40 may pressurize the piston unit 60. Then, a pressurizing part 63 of the piston unit 60 may pressurize the elastic member 11.

Since one side (left side in FIG. 1) of the elastic member 11 is fixed to the inner wall of the housing 10, the elastic member 11 is compressed by the pressurization of the piston unit 60 at the other side thereof (right side in FIG. 1). As the applied external force disappears, the compressed elastic member 11 may pressurize the piston unit 60 through an elastic restoring force, and move the piston unit 60 to the right. Subsequently, as the nut screw part 40 and the bolt screw 50 are moved to the right, the cable 70 may be moved to the right. Then, the ring connection part 91 connected to the cable 70 may be moved to remove a gap which can occur between the ring connection part 91 and the operating lever 93. Such a structure may prevent the reduction in operating force of the cable 70, thereby suppressing the reduction in braking force of the parking brake apparatus.

The nut screw part 40 and the driven gear 32 may be moved within the nut screw space part 13 and the gear space part 15, respectively, and the elastic member 11 may be compressed by the pressurizing part 63 of the piston unit 60.

Then, when the external force is removed, the compressed elastic member 11 may provide a tension to the cable 70 of which the operating force is reduced due to long-term use, vibration of the vehicle, or temperature change, while being elastically restored. Thus, it is possible to suppress the reduction in operating force of the cable 70.

One side (left side in FIG. 1) of the bolt screw 50 may be housed in the piston unit 60. The bolt screw 50 may be coupled to the nut screw part 40, and linearly reciprocate in the longitudinal direction (side-to-side direction in FIG. 2), while passing through the nut screw part 40. The bolt screw 50 may be connected to the cable 70 through the cable connection part 55. That is, one end of the cable connection part 55 may be connected to the bolt screw 50, and the other end of the cable connection part 55 may be connected to the cable 70.

The piston unit 60 may be installed in the housing 10 so as to slide in the side-to-side direction, and house the bolt screw 50 therein. The piston unit 60 may have one end (left end in FIG. 1) through which the cable 70 passes and the other end (right end in FIG. 1) which is contacted with the nut screw part 40. The cable 70 may be moved left and right while passing through the one end of the piston unit 60.

The piston unit 60 may include a guide rail 61 to guide the movement of a pin 51 of the cable connection part 55. The guide rail 61 may have a groove (not illustrated) formed on the inner surface thereof, the groove corresponding to the size of the pin 51. The pin 51 may be moved along the groove. The rotation of the pin 51 may be limited by the groove. Thus, when the pin 51 is moved along the groove, the cable connection part 55 may not be rotated, but linearly moved along the longitudinal direction in the guide rail 61.

The piston unit 60 may further include a pressurizing part 63 and a moving part 65. In the piston unit 60, the pressurizing part 63 may be contacted with the elastic member 11, and the moving part 65 may be contacted with the nut screw part 40. When the nut screw part 40 is moved to the left, the pressurizing part 63 of the piston unit 60 may pressurize the elastic member 11 while the moving part 65 of the piston unit 60 is moved to the left by the nut screw part 40.

Referring to FIGS. 1 and 3, the operation of the parking brake apparatus in accordance with the embodiment of the present invention will be described as follows.

Referring to FIG. 2, when a driver manipulates a button, switch, or lever to operate the parking brake apparatus, the ECU 5 may drive the motor unit 20. When the brake operation of the parking brake apparatus is performed, it may indicate that a braking force is applied to the wheel. On the other hand, when the brake operation of the parking brake apparatus is released, it may indicate that the braking force of the wheel is released.

The gear unit 30 may be operated by a rotating force generated by the motor unit 20. The rotating force of the motor unit 20 may be transmitted to the driving gear 31 of the gear unit 30, and the driving gear 31 may rotate the driven gear 32. According to the rotation of the driven gear 32, the nut screw part 40 may be rotated. The rotation of the nut screw part 40 may linearly move the bolt screw 50 to the right. At this time, since the rotation of the cable connection part 55 is limited by the pin 51 and the groove of the guide rail 61, the bolt screw 50 may be linearly moved to the right. Furthermore, the cable connection part 55 connected to the bolt screw 50 and the cable 70 connected to the cable connection part 55 may be moved in the same direction as the bolt screw 50. While the cable 70 is moved to the right, the ring connection part 91 connected to the cable 70 may operate the operating lever 93. Thus, the operating lever 93 may transmit a braking force to the wheel of the vehicle.

When the bolt screw 50 is moved to the right, the nut screw part 40 and the driven gear 32 may be moved to the left corresponding to the opposite direction of the movement direction of the bolt screw 50. That is, the nut screw part 40 and the driven gear 32 may be moved to the left within the nut screw space part 13 and the gear space part 15, respectively, which are formed in the housing 10. As the nut screw part 40 moved to the left pressures the moving part 65 to the left, the piston unit 60 may also be moved to the left. Thus, the pressurizing part 63 corresponding to the left end of the piston unit 60 may pressurize the elastic member 11, and the elastic member 11 may be elastically deformed and compressed.

Referring to FIG. 3, when the brake operation of the parking brake apparatus is intended to be released, the operation of the motor unit 20 may be stopped. When the operation of the motor unit 20 is stopped, the elastic member 11 may be restored to the original state, because the external force to compress the elastic member 11 is removed. As the elastic member 11 is restored to the original state, the elastic member 11 may pressurize the pressurizing part 63 of the piston unit 60 to the right. When the motor unit 20 is driven as illustrated in FIG. 2, the pressurizing part 63 may compress the elastic member 11 while pressurizing the elastic member 11 to the left. When the operation of the motor unit 20 is stopped as illustrated in FIG. 3, the elastic member 11 may move the pressurizing part 63 to the right while being restored to the original state.

As the pressurizing part 63 is moved to the right, the piston unit 60, or specifically the moving part 65 may also be moved to the right so as to move the nut screw part 40 to the right. At this time, the driven gear 32 integrated with the nut screw part 40 may also be moved to the right. As the nut screw part 40 is moved to the right, the bolt screw 50 coupled to the nut screw part 40 may also be moved the right side, and the cable connection part 55 connected to the bolt screw 50 may also be moved to the right.

Thus, since a tension is provided to the cable 70 while the cable 70 connected to the cable connection part 55 is moved to the right, a gap between the operating lever 93 and the ring connection part 91 connected to the cable 70 may disappear, which makes it possible to prevent the reduction in braking force of the parking brake apparatus.

That is, the elastic member 11 compressed by the pressurizing part 63 may provide an elastic restoring force toward the piston unit 60, and the bolt screw 50 may be moved in the moving direction of the piston unit 60. Then, the cable 70 connected to the bolt screw 50 through the cable connection part 55 may be moved to the right. Thus, a tension may be provided to the cable 70 to compensate for a gap between the ring connection part 91 and the operating lever 93 immediately after the brake operation of the parking brake apparatus is released. Then, it is possible to prevent the reduction in braking force of the parking brake apparatus due to a gap between the ring connection part 91 and the operating lever 93 during a brake operation.

Furthermore, since the tension is provided to the cable 70 through the restoring force of the elastic member 11 and thus compensates for a gap between the ring connection part 91 and the operating lever 93, it is possible to prevent the damage of various parts of the parking brake apparatus including the cable 70, which may occur when an excessive tension is provided to the cable 70.

Next, a parking brake apparatus in accordance with another embodiment of the present invention will be described.

Figure 4:
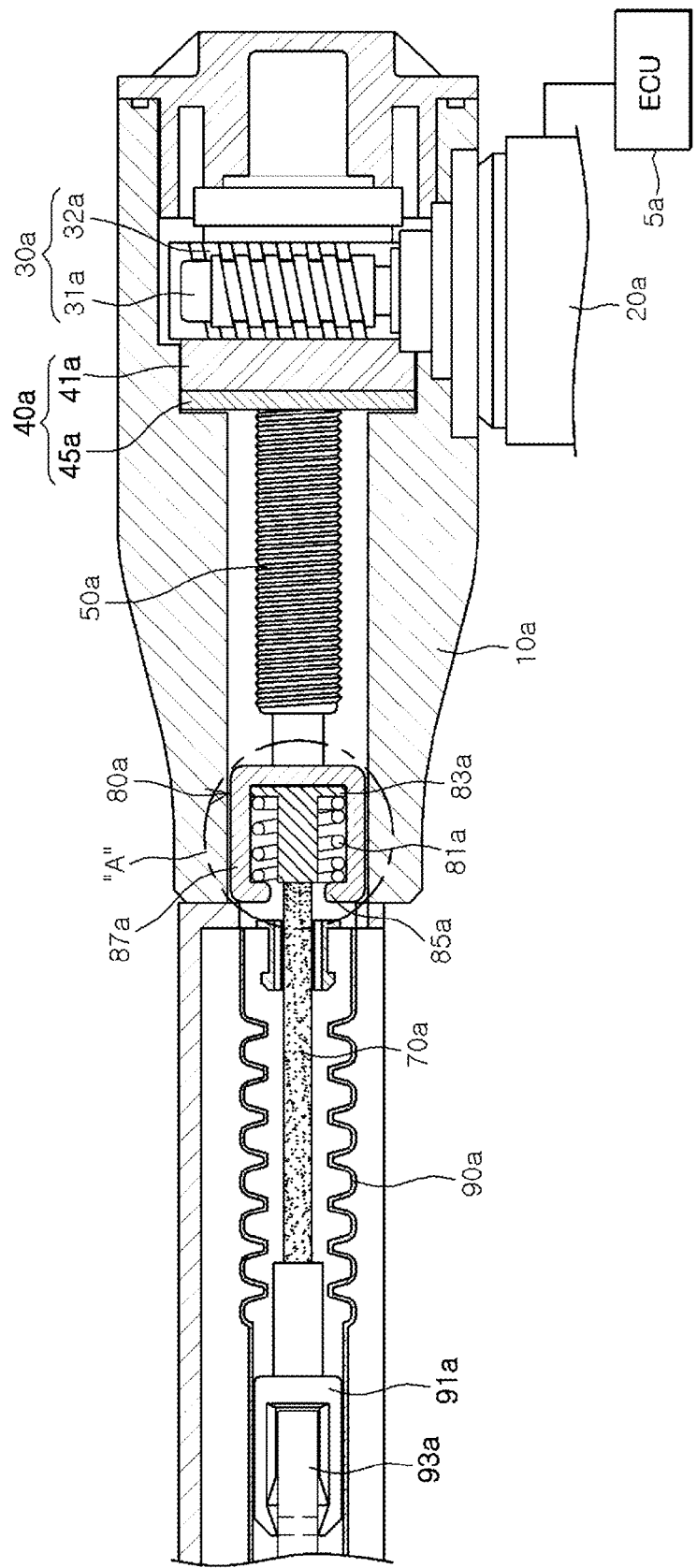
FIG. 4 is a schematic side cross-sectional view of a parking brake apparatus in accordance with another embodiment of the present invention.
Figure 5:
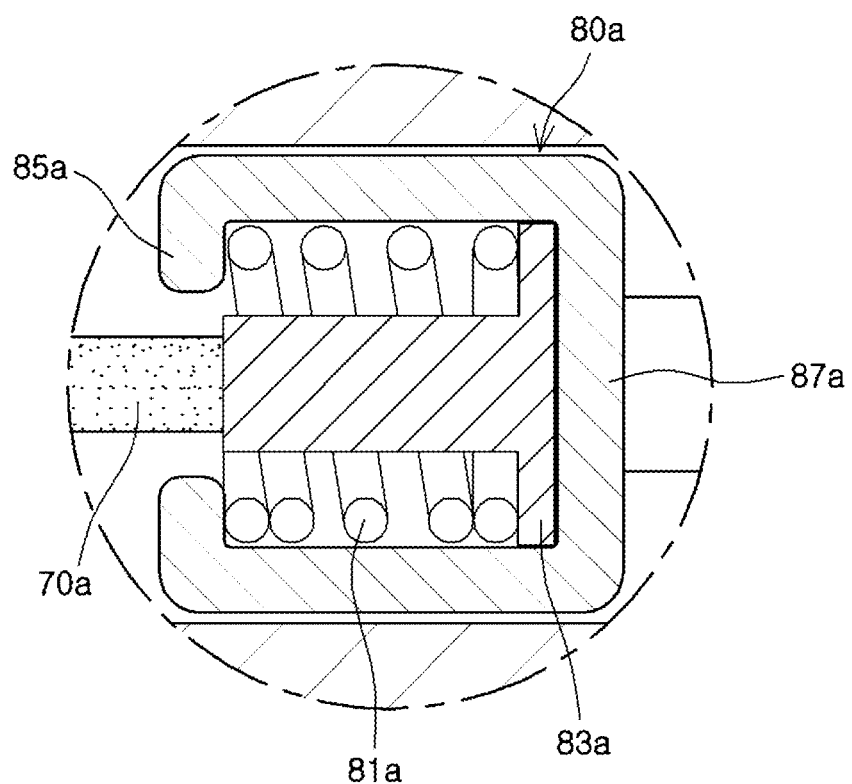
FIG. 5 is an expanded view of a portion A in FIG. 4.
Figure 6:
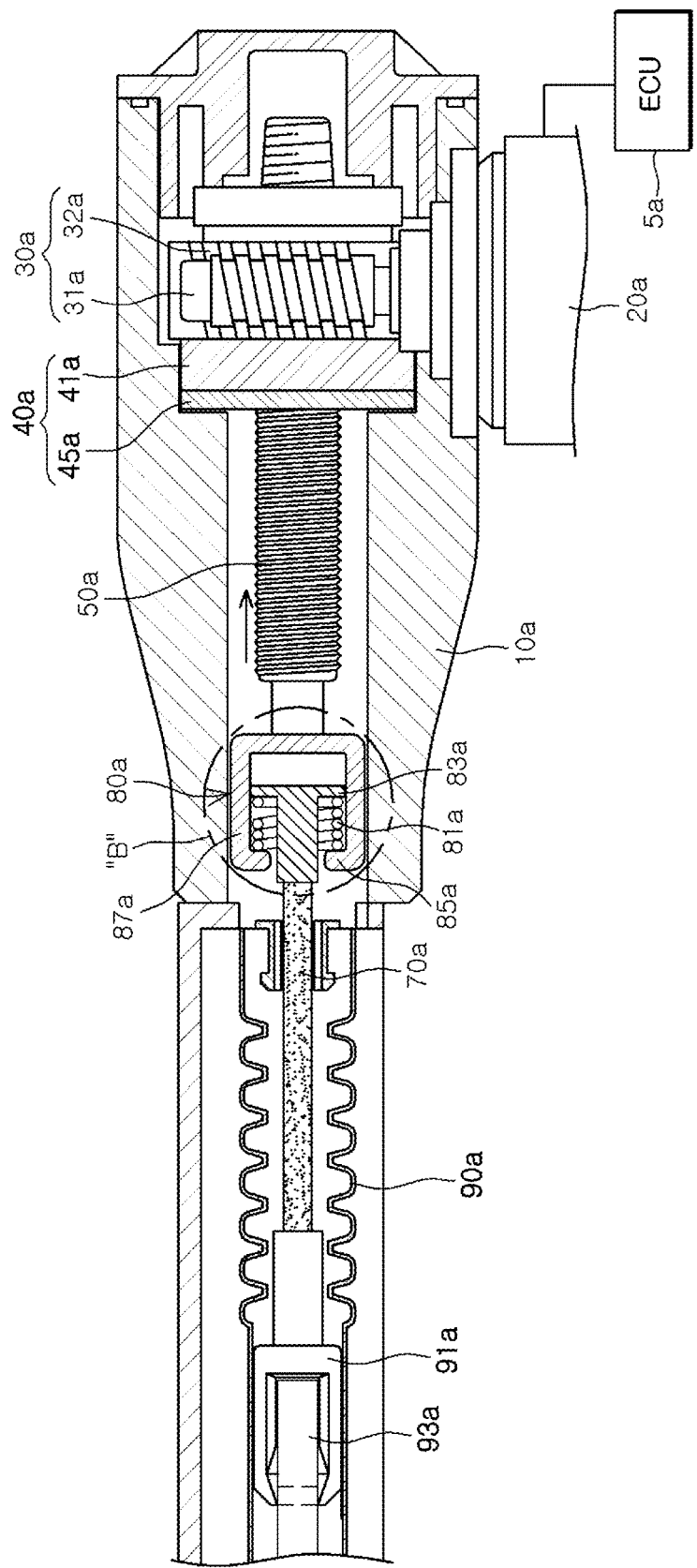
FIG. 6 is a schematic operation diagram illustrating that an elastic member is compressed in the parking brake apparatus in accordance with the embodiment of the present invention.
Figure 7:
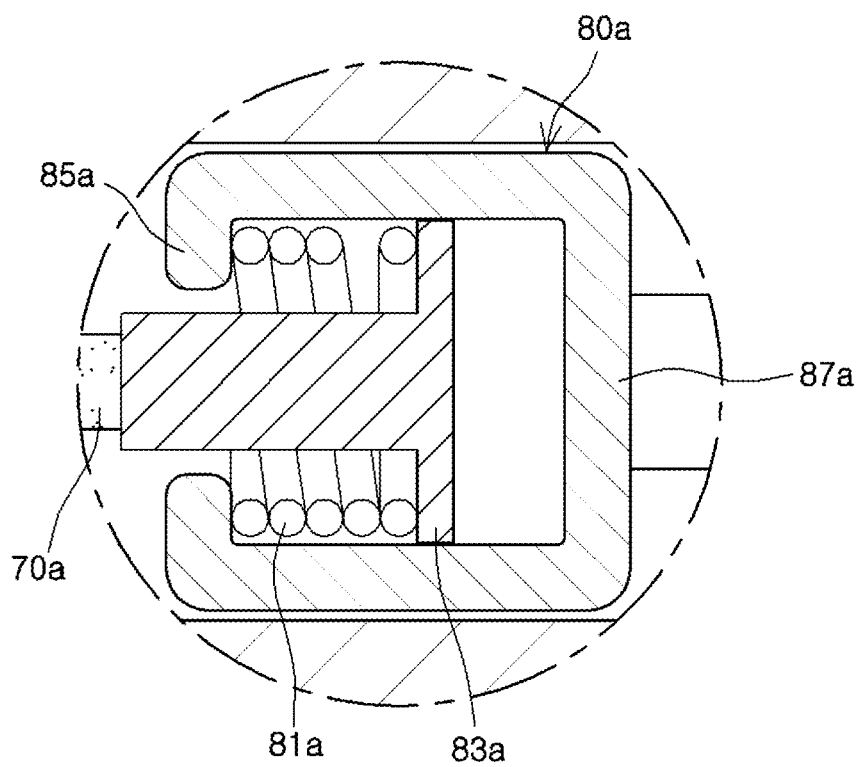
FIG. 7 is an expended view of a portion B in FIG. 6.
Figure 8:
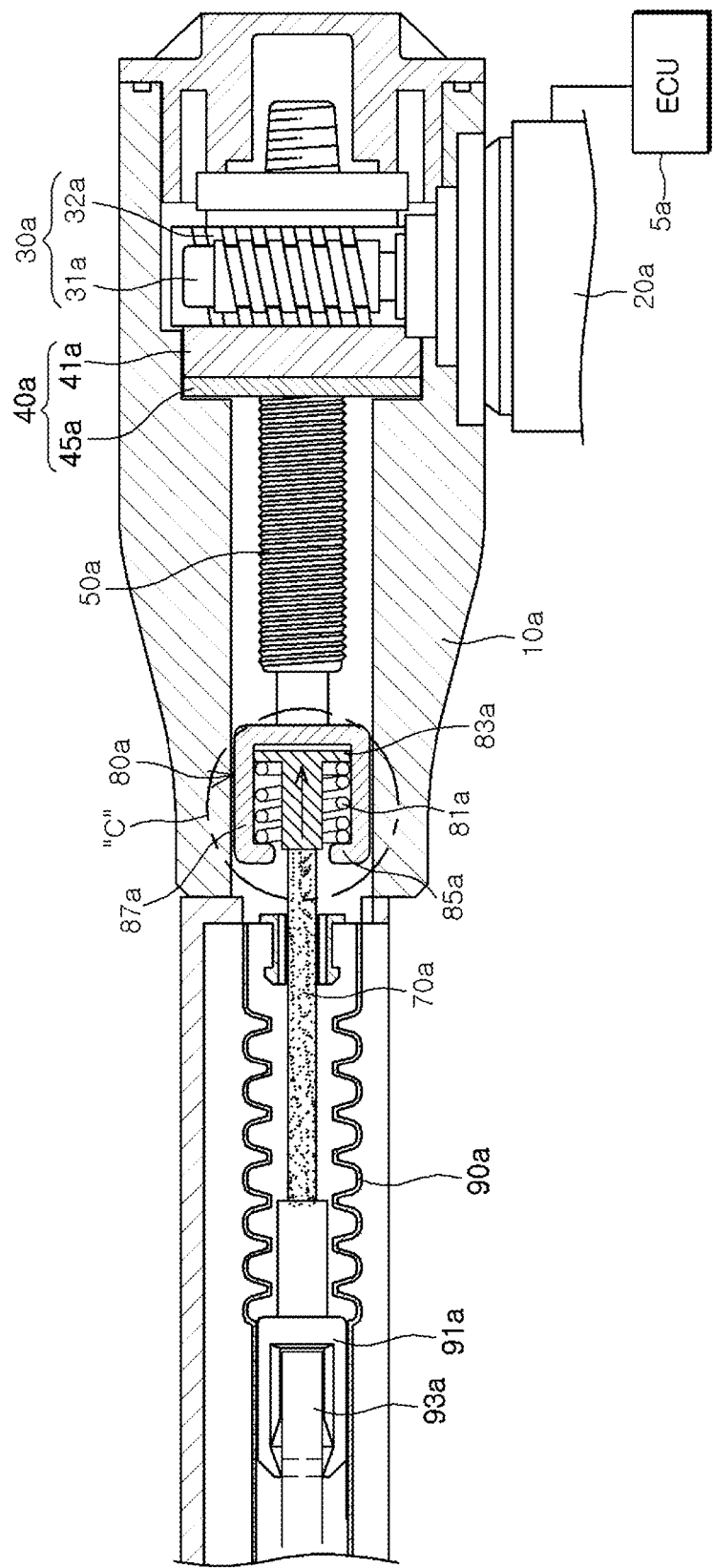
FIG. 8 is a schematic operation diagram illustrating a state in which the elastic member is restored in the parking brake apparatus in accordance with the embodiment of the present invention.
Figure 9:
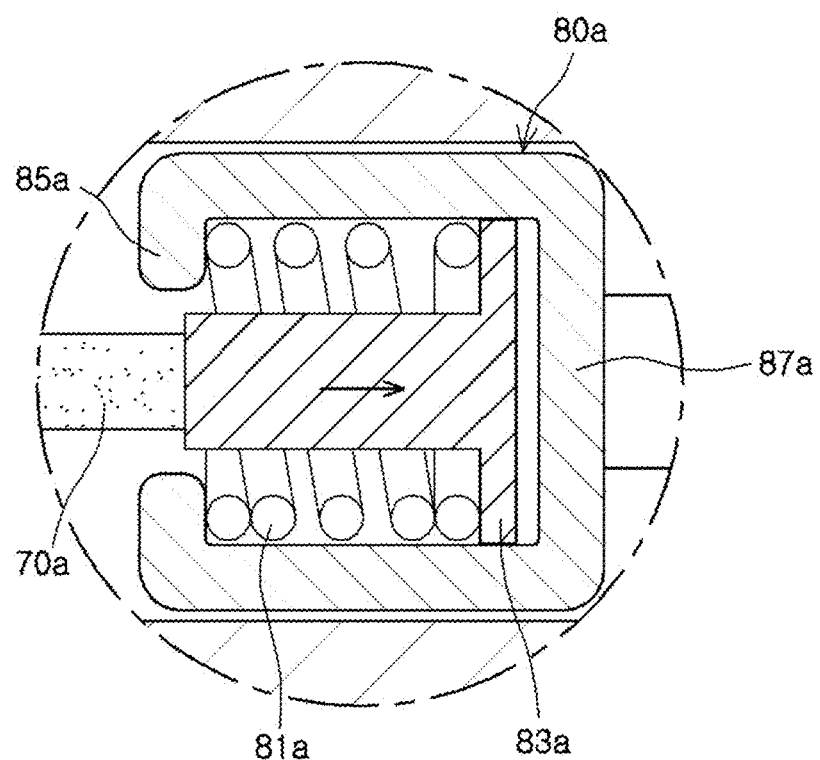
FIG. 9 is an expanded view of a portion C in FIG. 8.

FIG. 4 is a schematic side cross-sectional view of a parking brake apparatus in accordance with another embodiment of the present invention. FIG. 5 is an expanded view of a portion A in FIG. 4. FIG. 6 is a schematic operation diagram illustrating that an elastic member is compressed in the parking brake apparatus in accordance with the embodiment of the present invention. FIG. 7 is an expended view of a portion B in FIG. 6. FIG. 8 is a schematic operation diagram illustrating a state in which the elastic member is restored in the parking brake apparatus in accordance with the embodiment of the present invention. FIG. 9 is an expanded view of a portion C in FIG. 8.

Referring to FIGS. 4 and 5, the parking brake apparatus in accordance with the embodiment of the present invention may include a housing 10a, a motor unit 20a, a gear unit 30a, a nut screw part 40a, a bolt screw 50a, a cable 70a, a compression case 80a, and a boot part 90a.

The housing 10a may have a space formed therein, and include a metallic material or synthetic resin. The housing 10a may prevent internal parts, such as the gear unit 30a, the nut screw part 40a, the bolt screw 50a, and the compression case 80a, from being damaged by an external impact, or prevent the internal parts from being contaminated by foreign matters introduced from outside.

The motor unit 20a may be installed inside or outside the housing 10a. The operation of the motor unit 20a may be controlled by an ECU 5a. The motor unit 20a may convert electric energy applied from outside into rotational energy.

The rotational energy generated by the motor unit 20a may be transmitted to the gear unit 30a so as to rotate the gear unit 30a in a state where the rotation speed thereof is controlled. The ECU 5a may determine whether to operate the motor unit 20a, based on a load increase of the motor unit 20a (that is, a current increase). For example, the ECU 5a may stop the operation of the motor unit 20a when the load of the motor unit 20a rapidly increases.

The gear unit 30a may be operated by power transmitted from the motor unit 20a, and include a driving gear 31a and the driven gear 32a. The driving gear 31a may be connected to a rotating shaft of the motor unit 20a, and have a plurality of gears formed on the outer circumferential surface thereof. One end of the driven gear 32a may be engaged with the driving gear 31a, and the other end (left side in FIG. 4) of the driven gear 32a may be connected to the nut screw part 40a. The driven gear 32a and the nut screw part 40a may be fixed to each other. Thus, when the driven gear 32a is rotated, the nut screw part 40a may be rotated together. The driven gear 32a may have a screw thread formed on the inner circumferential surface thereof so as to be coupled to the bolt screw 50a.

Since the gear unit 30a includes the driving gear 31a and the driven gear 32a, the gear unit 30a may convert a rotational motion of the motor unit 20a into a linear motion, and the installation space of the gear unit 30a may be reduced. In the present embodiment, the driving gear 31a and the driven gear 32a may be implemented with a worm gear and a helical gear, respectively.

The nut screw part 40a may be connected to the driven gear 32a of the gear unit 30a, and rotated by the operation of the gear unit 30a. The bolt screw 50a may pass through the nut screw part 40a, and the nut screw part 40a may have a screw thread corresponding to the screw thread of the bolt screw 50a. Thus, the bolt screw 50a and the nut screw part 40a may be coupled to each other. In the present embodiment, the nut screw part 40a may include a nut screw 41a and a bearing 45a. The nut screw 41a may be connected to the driven gear 32a, and rotated when the driven gear 32a is rotated. The bearing 45a may be installed at one side of the nut screw 41a, that is, at the opposite side of the other side at which the driven gear 32a is arranged, and help the nut screw 41a to smoothly rotate.

One end (left end in FIG. 4) of the bolt screw 50a may be connected to the compression case 80a, or specifically a compression case body 87a, and the other end (right end in FIG. 4) of the bolt screw 50a may be coupled to the nut screw part 40a. Thus, when the motor unit 20a is driven, the bolt screw 50a may be linearly moved in the longitudinal direction while passing through the nut screw part 40a in the housing 10a.

The compression case 80a may be connected to the bolt screw 50a at the right side in FIG. 4, and connected to the cable 70a at the left side in FIG. 4. The compression case 80a may include the compression case body 87a, a fixing member 83a, and a pressurizing member 85a. The elastic member 81a may be installed in the compression case body 87a. The elastic member 81a may include rubber or silicone. In the present embodiment, the elastic member 81a may be provided in the form of a spring, for example.

One surface (left side in FIG. 5) of the compression case body 87a may be opened, and the other surface (right side in FIG. 5) of the compression case body 87a may be connected to the bolt screw 50a. The compression case body 87a may be installed in the internal space of the housing 10a so as to be moved according to the movement of the bolt screw 50a. The fixing member 83a installed in the compression case body 87a may be connected to the cable 70a.

The elastic member 81a may be installed to be fitted into the fixing member 83a, and the right end of the elastic member 81a may be supported by a plate part formed at the right end of the fixing member 83a. For this structure, the fixing member 83a in accordance with the present embodiment may be formed in a T-shape. The left end of the elastic member 81a may be supported by the pressurizing member 85a, and the right end of the elastic member 81a may be supported by the fixing member 83a. Thus, as an interval between the pressurizing member 85a and the fixing member 83a, or particularly between the pressurizing member 85a and the plate part of the fixing member 83a decreases, the elastic member 81a may be elastically deformed and compressed.

One side (left side in FIG. 4) of the cable 70a may be connected to a ring connection part 91a. The ring connection part 91 may be connected to an operating lever 93 to operate the brake. When the cable 70a is pulled to the right, the operating lever 93a may be operated to transmit a braking force to a wheel of the vehicle. At this time, when the brake operation of the parking brake apparatus is released, a gap may occur between the ring connection part 91 and the operating lever 93a while the position of the operating lever 93 or the like is changed. Then, when a brake operation is performed again by the parking brake apparatus, the operating force of the cable 70a to pull the operating lever 93a may be reduced due to the gap between the ring connection part 91a and the operating lever 93a. In the present embodiment, when a gap occurs between the ring connection part 91a and the operating lever 93a, the parking brake apparatus may immediately compensate for the gap using the compression case 80a and the elastic member 81a, thereby preventing the reduction in operating force of the cable 70a.

The pressurizing member 85a may be formed at the left end of the compression case body 87a so as to fix the position of the left end of the elastic member 81a. In the present embodiment, the pair of pressurizing members 85a may be formed to face each other, and the interval between the pair of pressurizing members 85a may be set to be smaller than the width of the elastic member 81a. Thus, the pressurizing members 85a may be support the left end of the elastic member 81a.

The boot part 90a may have an internal space through which the cable 70a passes, and include a plurality of creases formed on the outer surface thereof, in order to block foreign matters or moisture from being introduced from outside. The boot part 90a may include a rubber material which can be elastically deformed.

Referring to FIGS. 6 and 9, the operation of the parking brake apparatus in accordance with the embodiment of the present invention will be described as follows.

Referring to FIGS. 6 and 7, when a driver manipulates a button, switch, or lever to operate the parking brake apparatus, the ECU 5a may drive the motor unit 20a. When a brake operation of the parking brake apparatus is performed, it may indicate that a braking force is applied. On the other hand, when the brake operation of the parking brake apparatus is released, it may indicate that the braking force is released.

The gear unit 30a may be operated by a rotational force generated by the motor unit 20a. The rotational force of the motor unit 20a may be transmitted to the driving gear 31a of the gear unit 30a, and the driving gear 31a may rotate the driven gear 32a. According to the rotation of the driven gear 32a, the nut screw part 40a may be rotated together. The rotation of the nut screw part 40a may linearly move the bolt screw 50a to the right in the housing 10.

When the bolt screw 50a is moved to the right, the compression case 80a connected to the bolt screw 50a, that is, the compression case body 87a, the pressurizing member 85a, and the fixing member 83a may also be moved to the right. At this time, as the interval between the pressurizing member 85a and the fixing member 83a, or specifically between the pressurizing member 85a and the plate part of the fixing member 83a gradually decreases, the elastic member 81a may be elastically deformed and gradually compressed. As the fixing member 83a is moved to the right, the cable 70a connected to the fixing member 83a may also be moved to the right. Then, the ring connection part 91a connected to the cable 70a may be moved to operate the operating lever 93a, thereby providing a braking force to the wheel of the vehicle.

Referring to FIGS. 8 and 9, when the brake operation of the parking brake apparatus is intended to be released, the operation of the motor unit 20a may be stopped. When the operation of the motor unit 20a is stopped, the operations of the gear unit 30a, the nut screw part 40a, and the bolt screw 50a may also be stopped.

As the operation of the bolt screw 50a is stopped, the movement of the compression case body 87a and the pressurizing member 85a may be also be stopped. Since the pressurizing member 85a supporting the left end of the elastic member 81a is not moved but stopped, the right end of the elastic member 81a may be extended to the original position in a state where the left end of the elastic member 81a is fixed, when the elastic member 81a is restored by removing the external force. As the elastic member 81a is restored to the original state, the plate part of the fixing member 83a supporting the right end of the elastic member 81a may be moved to the right, and the cable 70a connected to the fixing member 83a may also be moved to the right. The movement of the fixing member 83a to the right may be performed until the fixing member 83a comes in contact with the inner wall of the compression case body 87a.

Thus, since a tension is provided to the cable 70a while the cable 70a is moved to the right, a gap between the operating lever 93a and the ring connection part 91a connected to the cable 70a may disappear, which makes it possible to prevent the reduction in braking force of the parking brake apparatus.

That is, when the elastic member 81a is restored to the original state as the operation of the motor unit 20a is stopped, the fixing member 83a and the cable 70a may be moved in the restoration direction of the elastic member 81a. Thus, a tension may be provided to the cable 70a so as to compensate for a gap between the ring connection part 91a and the operating lever 93a immediately after the brake operation of the parking brake apparatus is released. Then, it is possible to prevent the reduction in braking force of the parking brake apparatus due to a gap between the ring connection part 91a and the operating lever 93a during a brake operation.

Furthermore, since a tension is provided to the cable 70 through the restoring force of the elastic member 81a and thus compensates for a gap between the ring connection part 91a and the operating lever 93a, it is possible to prevent the damage of various parts of the parking brake apparatus including the cable 70a, which may occur when an excessive tension is provided to the cable 70a.

As described above, when the fixing member 83a and the cable 70a are moved to the right as the elastic member 81a is restored, the movement of the motor unit 20a, the gear unit 30a, the nut screw part 40a, and the bolt screw 50a may be stopped.

In accordance with the embodiment of the present invention, the parking brake apparatus may compensate for a gap between components, or particularly a gap between the ring connection part and the operating lever immediately after a brake operation of the parking brake apparatus is released, thereby preventing the reduction in braking force of the parking brake apparatus.

Furthermore, since a tension is provided to the cable through the elastic member and thus compensates for a gap between the ring connection part and the operating lever, it is possible to prevent the damage of the parts of the parking brake apparatus, which may occur when an excessive tension is provided to the cable.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A parking brake apparatus comprising:
   a housing;
   a motor-driven gear installed in the housing;
   a nut screw connected to the motor-driven gear and configured to rotate about an axis in accordance with rotation of the motor-driven gear;
   a bolt screw coupled with the nut screw and configured to move along the axis in connection with rotation of the nut screw;
   a cable connected to the bolt screw;
   a piston installed in the housing and configured to slide relative to the housing; and
   an elastic member arranged between an inner wall of the housing and the piston, the elastic member configured to elastically deform as the piston slides relative to the housing,
   wherein the housing comprises a nut screw space in which the nut screw can move in a direction opposite to the bolt screw's movement along the axis.

2. The parking brake apparatus of claim 1, wherein the nut screw space has a stepped portion formed on a movement path of the nut screw, the stepped portion is configured to restrict movement of the nut screw.

3. The parking brake apparatus of claim 1, wherein when the motor-driven gear operates and the nut screw moves in the direction, the nut screw is configured to push the piston such that the piston slides in the direction to compress the elastic member.

4. The parking brake apparatus of claim 3, wherein when the motor-driven gear stops after the nut screw moves in the direction, the elastic member is configured to expand and move the piston back in another direction opposite to the direction while pulling the cable and while moving both the nut screw and the bolt screw together with the piston.

5. The parking brake apparatus of claim 4, wherein the cable is configured to be pulled to compensate for a gap between an operating lever of a parking brake and a ring connected to the cable.

6. The parking brake apparatus of claim 1, further comprising a cable connector arranged between the bolt screw and the cable and connecting the bolt screw and the cable.

7. The parking brake apparatus of claim 1, wherein the motor-driven gear and a shaft of a motor are connected to each other with at least one intervening gear therebetween.

* * * * *